Figure 1:
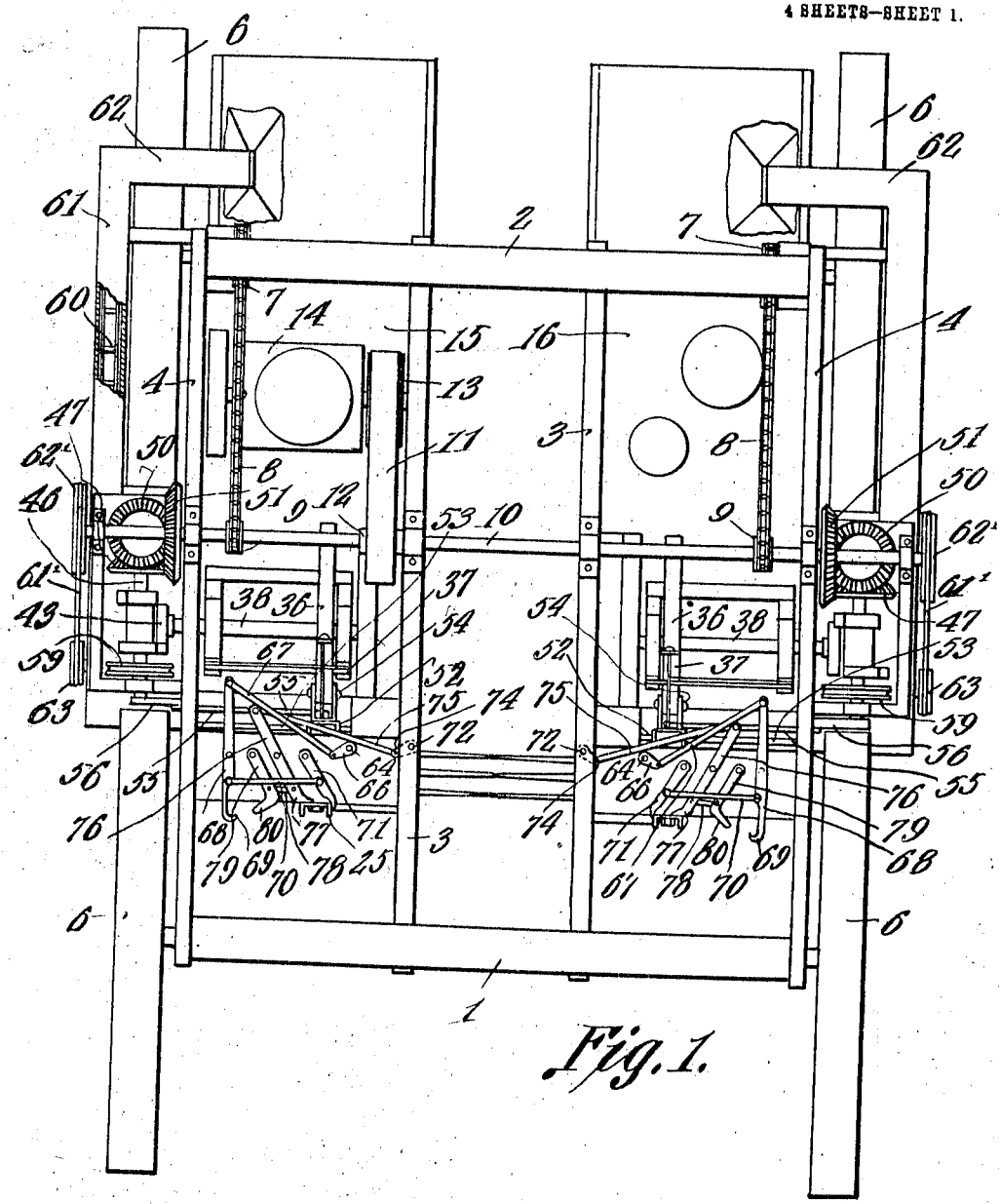

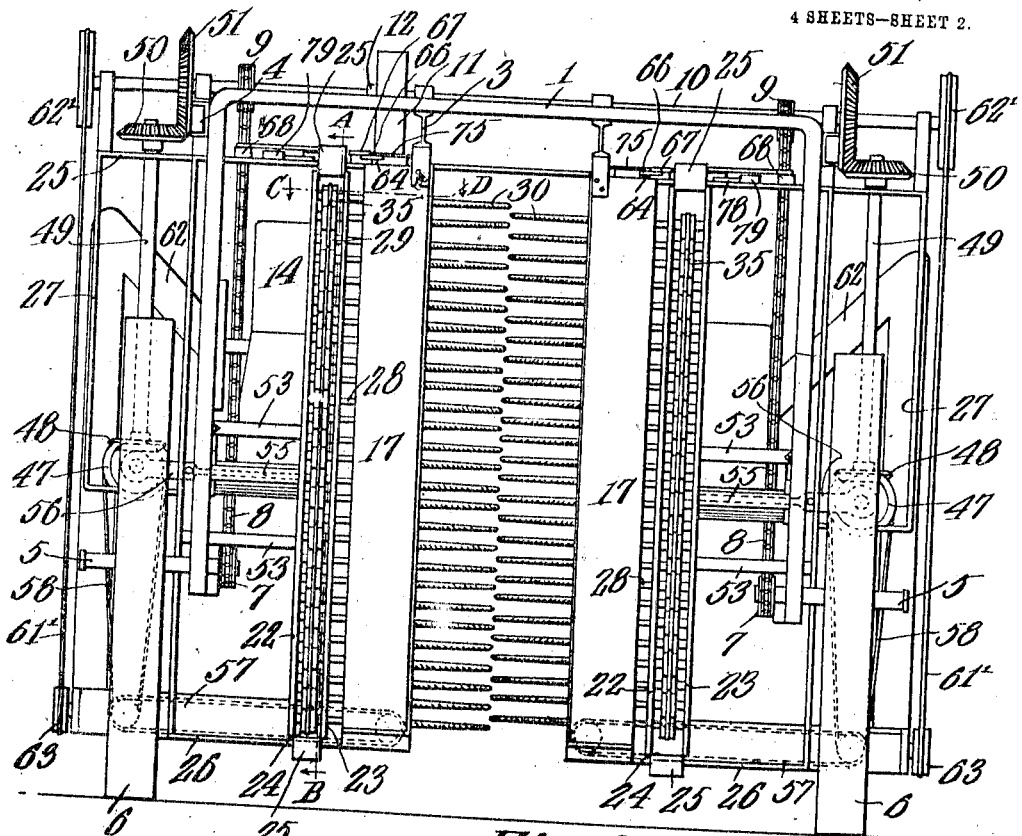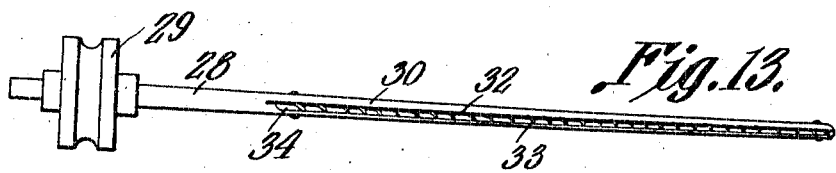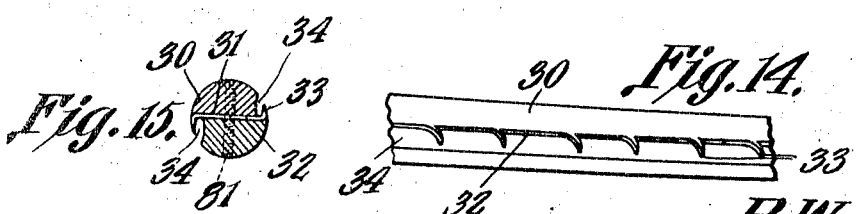

R. W. IVEY.
COTTON PICKER.
APPLICATION FILED APR. 9, 1912.
1,088,703.
Patented Mar. 3, 1914.
4 SHEETS—SHEET 3.
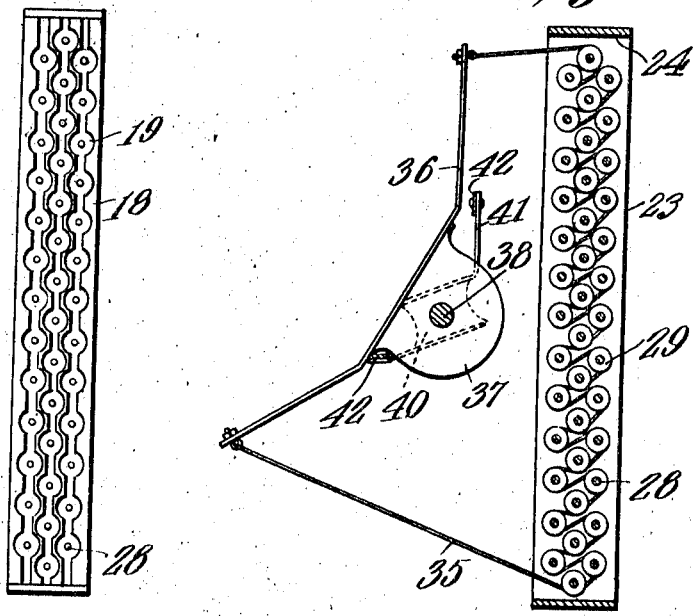
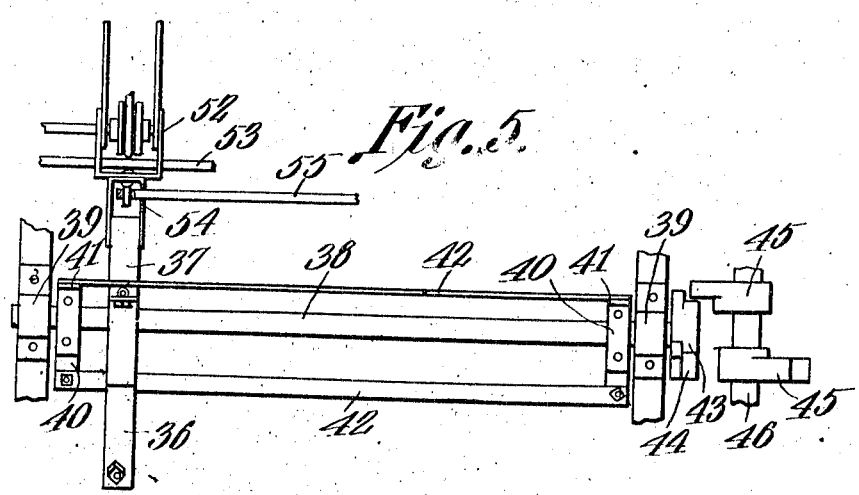
R. W. Ivey,
Inventor
by C. A. Snow & Co.
Attorneys

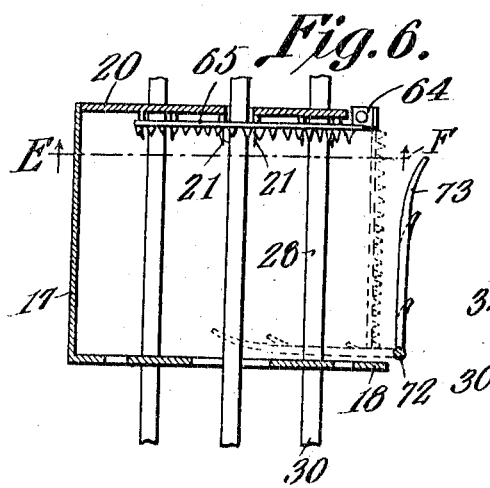
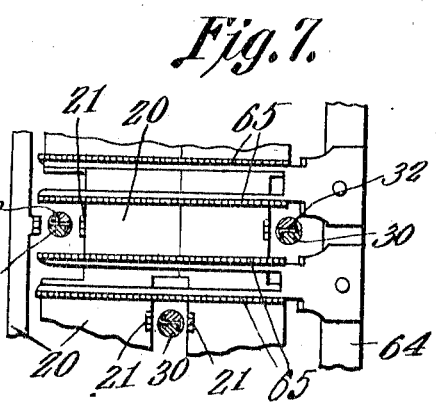
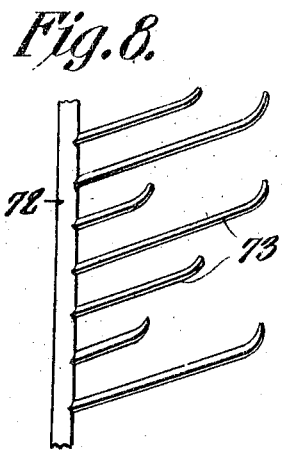
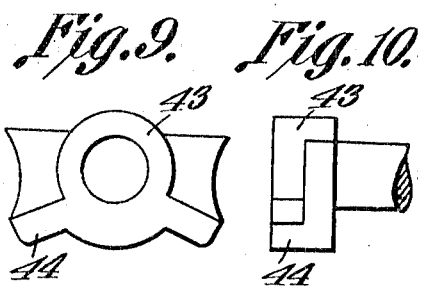
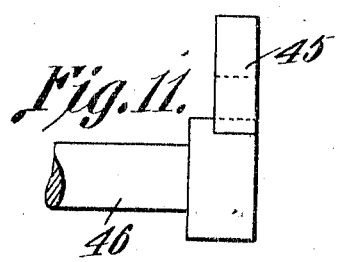

UNITED STATES PATENT OFFICE.

ROBERT W. IVEY, OF NEW LONDON, NORTH CAROLINA, ASSIGNOR OF ONE-HALF TO WILLIAM T. HARRIS, OF VIRGILINA, VIRGINIA.

COTTON-PICKER.

1,088,703.

Specification of Letters Patent. Patented Mar. 3, 1914.

Application filed April 9, 1912. Serial No. 689,645.

*To all whom it may concern:*

Be it known that I, ROBERT W. IVEY, a citizen of the United States, residing at New London, in the county of Stanly and State of North Carolina, have invented a new and useful Cotton-Picker, of which the following is a specification.

This invention relates to machines for picking cotton, one of its objects being to provide a motor propelled machine of this type having oppositely disposed heads adapted to travel along opposite sides of a row of plants, each head carrying a series of toothed spindles having mechanism for shifting them toward and away from the plants as the machine travels along the row.

A further object is to provide novel means for rotating the spindles while projected so as thus to cause the fibers, engaged thereby, to be wound upon the spindles.

A further object is to provide novel means for stripping the cotton from the spindles while said spindles are being retracted into the machine.

Another object is to provide simple and efficient means for reciprocating the spindles and for rotating them when they approach each limit of their longitudinal movement.

A further object is to provide spindles having teeth of novel form connected therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a front elevation, the stripping mechanism being concealed behind the front plates. Fig. 3 is an elevation of one of the picking heads and of the spindles therein. Fig. 4 is a section through the picking head on the line A—B Fig. 2. Fig. 5 is a plan view of the spindle rotating mechanism. Fig. 6 is a section through the front or shield plate and showing portions of the shafts of certain of the spindles and also showing portions of the stripping mechanism, the line on which the section is taken being indicated at C—D in Fig. 2 and the parts being turned at right angles to their positions in said Fig. 2. Fig. 7 is a section on line E—F Fig. 6. Fig. 8 is a perspective view of a portion of one series of delivering fingers. Fig. 9 is a face view of one of the members of the spindle rotating mechanism. Fig. 10 is a side elevation thereof. Fig. 11 is a side elevation of one of the cams or tappets of said mechanism. Fig. 12 is a face view thereof. Fig. 13 is a side elevation of one of the spindles. Fig. 14 is an enlarged elevation of a portion thereof. Fig. 15 is a transverse section through one of the spindles.

Referring to the figures by characters of reference 1 and 2 designate front and rear arches connected, adjacent their centers, by longitudinally extending parallel beams 3 and, at their sides by upper longitudinally extending beams 4. Stub axles 5 extend laterally from the lower ends of the arches 1 and 2 and supporting wheels 6 support these axles. Sprockets 7 are secured to and rotate with the stub axles of the rear wheels 6 and receive motion, through chains 8 from sprockets 9 secured to a main drive shaft 10 which is journaled on the beams 3 and 4 at the centers thereof. This shaft is adapted to be actuated by a belt 11 engaging a pulley 12 on the shaft 10 and another pulley 13 driven by a motor 14 which is mounted on a platform 15. This platform is supported in any suitable manner under the rear arch 2 at one side thereof, there being another platform 16 extending under the arch 2 at the other side thereof, the space between the two platforms and under the arches 1 and 2 being sufficient to receive a row of cotton plants to be acted on by the machine.

Mounted on the front end portion of each platform 15 and 16 is a picking head including an upstanding front or shield plate 17 from the inner side edge of which extends a series of stop strips 18 having opposed recesses therein forming apertures 19 for the purpose hereinafter set forth. This arrangement of the retaining strips has been illustrated in Fig. 3. It is to be understood, however, that instead of utilizing a series of strips such as shown in this figure, a single plate may be employed, said plate being formed with openings located in the same manner as are the openings 19. At the outer side of the shield plate 17 and parallel with the stop strips 18 is a stripping plate 20 having openings therein at the sides of which are formed toothed tongues 21. Parallel supporting plates 22 and 23 are located between the stripping plate 20 and the near or adjacent side of the machine and are parallel with the stripping plate. These supporting plates are connected together at their upper and lower ends by end plates 24 the front ends of which extend upwardly and downwardly respectively, so as to lap the front edges of the top and bottom members 25 and 26 of a frame to which the plates 17, 18 and 20 are secured. This frame extends upwardly from the front end of the platform 15 or 16, the outer side portion of the frame being indicated at 27 in Fig. 2.

A series of shafts 28 are journaled in the holding plates 22 and 23 and are disposed in staggered relation, each of these shafts being provided, between the plates 22 and 23, with a grooved wheel or pulley 29. The shafts terminate in spindles 30 which are adapted to extend through the openings in the stripping plate 20 and the stop strips 18. Each spindle 30 is split longitudinally, as shown at 31 so as to receive a plate 32 formed along opposite edges with sharp teeth 33, the teeth along one edge being extended in a direction opposite to the teeth along the other edge. Grooves 34 are formed in the spindles and are overhung by the teeth, the outer faces of the teeth lying in the arc of the periphery of the spindle. The teeth on each spindle are extended in the direction of rotation of the spindle so that, when said spindle comes into contact with the cotton, the fibers will be engaged by the teeth and wrapped upon the spindle.

The various pulleys on the shaft 28 of each series are engaged successively by an actuating cord 35, as shown particularly in Fig. 4, the ends of the cord being attached to the ends of a walking beam 36, the bearing block 37 of which is mounted to slide on a shaft 38 mounted for rotation in bearings 39 carried by portions of the frame 27. This shaft 38 extends at right angles to the path of movement of the machine and is provided, near its ends, with heads 40 adapted to rotate with the shaft. Said heads have oppositely extending arms 41, the outer ends of the arms being connected by parallel shifting strips 42 which are normally supported close to the respective arms of the walking beam 36.

Secured to one end of the shaft 38 is a head 43 having diverging wings 44. These wings are adapted to be contacted and depressed successively by cams or tappets 45 secured to and rotating with a shaft 46. This shaft has a gear 47 secured thereto and which receives motion through a gear 48 from a vertical shaft 49. A gear 50 is secured to the upper end of this shaft and meshes with a gear 51 secured to the shaft 10. Thus it will be seen that, during the rotation of shaft 10, shaft 46 will be rotated and the cams or tappets 45 will strike first one wing 44 and then the other wing 44, thus rocking the shaft 38 and causing the shifting strips 42 to strike the arms of the walking beam 36 successively and thus cause the cord 35 to be pulled back and forth along the pulleys 29. It will be seen that the constant rotation of the shaft 46 will result in the simultaneous rotation of the spindles 30 in one direction and then, after a pause, in the opposite direction, this intermittent rotation continuing throughout the operation of the machine.

The slidable structure made up of the holding plates 22 and 23 and their connections has a yoke 52 fixedly connected thereto and mounted to slide on a guide rod 53 secured to the frame of the machine. A U-shaped guide 54 is secured to and extends rearwardly from the yoke and straddles the block 37 of the walking beam 36. A pitman 55 is connected to the guide 54 and has one end connected to a crank arm 56 secured to and rotating with the shaft 46. Thus it will be seen that during the constant rotation of shaft 46, the guide 54 and yoke 55 will be reciprocated, thereby moving the plates 22 and 23 and the spindles 30 therewith. The parts are so timed that as the spindles are completing their movement outwardly through the openings between the stop strips, one of the cams or tappets 45 strikes one of the wings 44 and thereby actuates the walking beam 36 so as to rotate all of the spindles so as to cause the teeth on the spindles to engage the cotton fibers and wrap them about the spindles. The parts are furthermore so timed that during the retraction of the spindles into the picking head and back of the shield plate 17, the spindles will not rotate but, as they approach their innermost positions, the other wing 44 will be engaged by the other cam or tappet 45 and the spindles simultaneously rotated in the opposite direction so as to cause the teeth on the spindles to pull out of the fibers engaged thereby.

An endless conveyer 57 is mounted back of each picking head and receives motion, through a belt 58, from a wheel 59 on shaft 46, as shown particularly in Fig. 2. This conveyer is designed to discharge onto an endless elevator 60 arranged within an upwardly and rearwardly extending housing 61 which discharges into a downwardly inclined spout 62. The elevator 60 receives motion through a belt 61' from a wheel 62' secured to shaft 10, said belt driving a wheel or pulley 63 located at one end of the elevator. The discharge end of spout 62 is located above the platform 15 or 16 and a basket or bag may be mounted on this platform at a point to receive the material discharged from the spout.

In order that the cotton may be removed from the spindles and delivered to the conveyers 57, novel stripping mechanism has been provided. This mechanism includes a shaft 64 disposed vertically and close to the rear edge of the stripping plate 20. Secured to the shaft are fingers 65 arranged in pairs, as shown in Fig. 7, the fingers of each pair being parallel and provided with outstanding teeth. The spindles 30 normally extend through the spaces between the teeth 21. The fingers 65 under normal conditions, lie close to and parallel with the stripping plate 20. The toothed tongues 21 on the stripping plate project between the fingers so that it will thus be seen that under normal conditions each spindle is arranged between two toothed tongues 21 and the teeth on two fingers 65. In this connection see Fig. 7 of the drawings. A crank arm 66 is secured to the upper end of the shaft 64 and is connected, by a link 67, to one arm of a shifting lever 68 fulcrumed on the top of the picking head. The other arm of said shifting lever terminates in a hook 69 which projects forwardly beyond the picking head and in the path of the upper projection 25 carried by the plates 22 and 23. Said hooked arm of lever 68 is also connected, by means of a link 70 to a lever 71 the free end of which projects forwardly beyond the picking head and into the path of the projection 25.

A shaft 72 is arranged vertically along the rear edge of the series of stop strips 18 and extending horizontally from this shaft are slightly curved delivering fingers 73 preferably of different lengths, as shown particularly in Fig. 8. A crank arm 74 is secured to the upper end of shaft 72 and is connected, by means of a link 75, to one arm of a lever 76 fulcrumed on the top of the picking head, the other arm of the said lever terminating in a hook 77 which is normally retracted back of the path of the projection 25. The hooked arm of lever 76 is connected by a link 78, to a lever 79 fulcrumed on the top of the picking head and provided at its free end with a hook 80 which normally projects forwardly from the picking head and into the path of the projection 25. The normal positions of the parts have been shown in Fig. 1. With the parts thus located the stripping fingers 65 are positioned as illustrated in Fig. 6 back close to and parallel with the stripping plate 20 and the delivering fingers 73 are extended across the rear face of the picking head and substantially at right angles to the picking fingers.

It has already been stated that as the spindles reach their outermost positions, as shown in Fig. 1, they are rotated so that the teeth thereon will engage the cotton fibers and wrap them about the spindles. As the spindles begin to move laterally back into the picking heads in the manner hereinbefore described, the projection 25 of each picking head moves past the hook 77 of lever 76 and against the hook 80 of lever 79. Said hook and lever 80 and 79 are thus shifted by the projection and link 78 pulls on lever 76 which, in turn, thrusts against the crank arm 74 through link 75. The throwing or delivering fingers 73 are thus swung toward the inner faces of the stop strips 18 so as to assist said strips in holding back branches, leaves and other undesirable portions during the retraction of the non-rotating spindles into the picking heads. As hereinbefore stated, when the spindles are brought into the picking heads they are rotated backwardly so as to tend to withdraw their teeth from engagement with the fibers. During this rotation of the spindles, the projection 25 moves against the hooked arm 69 of lever 68, thereby causing said lever to push through link 67 against arm 66 and, at the same time, pull, through link 70, upon lever 71. Shaft 64 is therefore rotated by the crank arm 66 and the toothed stripping fingers 65 are swung inwardly and backwardly to the position indicated by dotted lines in Fig. 6. These fingers thus operate to pull the loosened cotton fibers off of the teeth on the spindles and to carry them to points above the conveyer 57. These fingers also tend to remove from the toothed tongues 21 any fibers which may have accumulated thereon during the retraction of the spindles. As the spindles move outwardly again to engage the cotton fibers, the projection 25 moves past the end of the lever 79 and engages the projecting hooked portion 77 of lever 76, thus shifting said lever and causing it to pull through link 75, upon crank arm 74. The delivering fingers 73 are thus caused to move back to the positions indicated by full lines in Fig. 6 and will, during this movement, swing between the stripping fingers 65 which have been brought to the position indicated by dotted lines in Fig. 6 and pull off of the teeth all of the fibers adhering thereto. As the fibers cannot adhere to the smooth faces of the fingers 73, they will fall onto the conveyer 57 and be carried thereby to the elevator 60. As the projection 25 continues to move during the projection of the spindles 30 toward the plants, it comes into contact with the projecting end of lever 71, thus causing said lever to pull, through link 70, upon lever 68 which, in turn, pulls through link 67, upon crank arm 66. The stripping fingers 65 are therefore returned to their normal positions, as indicated by full lines in Fig. 6, whereupon the operation hereinbefore described may be repeated.

It is to be understood of course that any desired number of spindles may be used in connection with each picking head and that the two picking heads are to be oppositely disposed so that, during the operation of the machine, the spindles of the two series will be simultaneously projected toward each other so as to engage opposite portions of the plants in the row along which the machine is traveling. The motor 14 can be utilized for propelling the machine during the actuation of the mechanism and the speed of travel so timed as to permit practically all portions of the plants to be acted on by the spindles so that no portions of the plants will be skipped. As hereinbefore stated the spindle is split longitudinally and receives a toothed strip. This strip can easily be held in place by means of screws 81 or the like and, should one of the strips become worn or broken, it can be easily removed and another one substituted therefor. The teeth on the spindles can be of any desired shape, it being necessary, however, to have them pointed and inclined toward the free end of the spindle. It is, furthermore, necessary that the teeth lie in the arc of the periphery of the spindle so as not to project sufficiently to engage leaves and other undesirable substances which may be contacted by the spindles. By utilizing the grooves 34 back of the teeth, the fibers are free to pass into the grooves and thus engage the teeth but it is obvious that leaves and the like are not sufficiently flexible to pass into the grooves and will not, therefore, be engaged by the teeth.

It will be seen that this machine is very light in construction and as its mechanism is comparatively simple it requires but little power to operate it.

What is claimed is:—

1. A cotton picker including a picking head, a series of fiber engaging spindles, means for reciprocating the spindles for wrapping cotton fibers thereon and for reversing the rotation of said spindles to unwrap the fibers therefrom, stripping elements for engaging the fibers while being unwrapped from the spindles, stripping fingers extending close to the spindles and the stripping elements, means for shifting the said fingers while the spindles are retracted, to remove the fibers from said elements and spindles.

2. A cotton picker including a picking head, a series of fiber engaging spindles, means for reciprocating the spindles, means for simultaneously rotating the spindles for wrapping cotton fibers thereon and for reversing the rotation of said spindles to unwrap the fibers therefrom, stripping elements for engaging the fibers while being unwrapped from the spindles, stripping fingers extending close to the spindles and the stripping elements, means for shifting the said fingers while the spindles are retracted, to remove the fibers from said elements and spindles, and means for automatically delivering the fibers from the fingers and onto the conveyer.

3. A cotton picking machine including spindles mounted for reciprocation, a laterally movable spindle carrying structure, a series of stripping fingers extending between the spindles, a series of delivering fingers extending between the spindles, means operated by said structure when moved in one direction for successively shifting the stripping fingers away from the spindles and moving the delivering fingers between the stripping fingers.

4. A cotton picker including a stripping plate, spindles mounted for reciprocation within the plate, means on the spindles for engaging cotton fibers to wrap them about the spindles, means for rotating the spindles when shifted away from the stripping plate, said spindles constituting means for conveying cotton to the stripping plate, oscillatory stripping fingers adjacent the plate for engaging the fibers, and means mounted to oscillate about a common fixed axis, for automatically removing the fibers from said stripping fingers and the spindles.

5. A cotton picker including a stripping plate, spindles mounted for reciprocation within the plate, means on the spindles for engaging cotton fibers to wrap them about the spindles, means for rotating the spindles when shifted away from the stripping plate, said spindles constituting means for conveying cotton to the stripping plate, oscillatory stripping fingers adjacent the plate for engaging the fibers, and spaced means mounted to oscillate about a common fixed axis for automatically removing said fibers from the stripping fingers and the spindles and conveying them laterally beyond the path of the spindles.

6. A cotton picker including a stripping plate, spindles mounted for reciprocation within the plate, means on the spindles for engaging cotton fibers to wrap them about the spindles, means for rotating the spindles when shifted away from the stripping plate, said spindles constituting means for conveying cotton to the stripping plate, movable stripping fingers adjacent outstanding from the plate for engaging the fibers, and spaced means mounted for movement about a common axis for detaching the fibers from the stripping fingers.

7. A cotton picker including a stripping plate, spindles mounted for reciprocation within the plate, means mounted for swinging movement about a fixed axis for removing fiber from the spindles during the retraction of the spindles into the plate, a conveyer at one side of the path of the spindles, and means for removing fibers from said stripping means and directing them onto the conveyer, said means being mounted for oscillation about a fixed axis.

8. A cotton picker including a stripping plate, cotton picking spindles mounted for reciprocation and rotation within the plate, means movable away from the plate during the retraction of the spindles for stripping fibers from the spindles, and means mounted for oscillation and movable between the paths of said stripping means for removing fibers from the stripping means and directing them beyond one side of the paths of the spindles.

9. A cotton picker including a stripping plate, cotton picking spindles mounted for reciprocation and rotation within the plate, means movable away from the plate during the retraction of the spindles for stripping fibers from the spindles, means mounted for oscillation and movable between the paths of said stripping means for removing fibers from the stripping means and directing them beyond one side of the paths of the spindles, a spindle carrying structure mounted for reciprocation, and means under the control of said structure for operating the stripping and removing means in properly timed relation.

10. In a cotton picker, the combination with a guide frame, of a structure movably mounted within the guide frame, means for reciprocating said structure, spindles mounted for rotation within and movable with said structure, means for rotating the spindles during the reciprocation of the structure, a stationary stripping plate having apertures through which the spindles extend, oscillatory means for stripping fibers from the spindles during the retraction of the spindles into the stripping plate, oscillatory means for removing fibers from the stripping means and directing them laterally beyond the path of the reciprocating structure, and means under the control of the said reciprocating structure for operating the stripping means and the removing means in properly timed relation.

In testimony that I claim the foregoing as my own, I have hereto affixed my signature in the presence of two witnesses.

ROBERT W. IVEY.

Witnesses:
SELINA WILLSON,
ERNEST F. RILEY.